United States Patent [19]
Kaneko et al.

[11] 3,774,041
[45] Nov. 20, 1973

[54] AUTOMATIC INSPECTOR OF THE SURFACE OF RUNNING OBJECT

[75] Inventors: Akira Kaneko, Kokubunji; Yutaka Nagata, Kodaira, both of Japan

[73] Assignees: Hitachi Electronics Co., Ltd.; Nisshin Steel Co., Ltd., Tokyo, Japan

[22] Filed: Aug. 24, 1972

[21] Appl. No.: 283,295

[30] Foreign Application Priority Data
Aug. 25, 1971 Japan.............................. 46/64362
Aug. 25, 1971 Japan.............................. 46/64363

[52] U.S. Cl. ............250/563, 250/219 WE, 356/200
[51] Int. Cl. ........................................ G01n 21/30
[58] Field of Search ............ 250/209, 214, 219 DF, 250/219 WE, 219 WD, 221, 222, 234, 235, 236; 356/199, 200, 202, 237

[56] References Cited
UNITED STATES PATENTS
| | | | |
|---|---|---|---|
| 3,646,353 | 2/1972 | Bhullar | 250/219 DF |
| 3,618,063 | 11/1971 | Johnson | 356/200 |
| 3,558,900 | 1/1971 | Moskowitz | 250/219 DF |
| 3,158,748 | 11/1964 | Laycak | 250/219 WE |

Primary Examiner—James W. Lawrence
Assistant Examiner—D. C. Nelms
Attorney—Paul M. Craig, Jr. et al.

[57] ABSTRACT

An apparatus for detecting defects in the surface of a running sheet material by continually scanning it in the transverse direction; wherein the running speed of the sheet object is detected, the amount of electricity proportional to the running speed is integrated by an integrator over the period of time for which the surface of the running sheet object is scanned by the light beam, the output of the integrator is converted into a plurality of pulses with different rise points by a comparator circuit including a plurality of comparator units for comparing the output of the integrator with a predetermined level, these pulses and a signal obtained as a result of the running object being scanned by a light beam are digitally processed by a digital processor thereby to convert them into a group of divided pulses of which the rise point of one occurs at the same time as the fall point of an adjacent pulse, and defect detection signals obtained by light-beam scanning of the object are recorded in sequence by a plurality of recorders corresponding to said divided pulses.

2 Claims, 4 Drawing Figures

AUTOMATIC INSPECTOR OF THE SURFACE OF RUNNING OBJECT

BACKGROUND OF THE INVENTION

1. Field of the Invention

This invention relates to an apparatus for automatically inspecting the surface of a running object, or more in particular to an apparatus for detecting defects such as unevenesses flaws or variations in luster on the surface of a metal plate, paper and plastic sheet while they are being processed.

2. Description of the Prior Art

A conventional device for detecting a defect on the surface of a running sheet object is known in which the surface of the object is scanned by a beam of light and the light reflected therefrom is used to find where a defect, if any, is located among a plurality of portions into which the running object is divided in the longitudinal direction. This conventional device, however, does not operate accurately in accordance with the changes in the running speed of the object.

SUMMARY OF THE INVENTION

Accordingly, it is an object of the present invention to provide an automatic defect inspecting apparatus whose operation is not adversely affected by changes in the running speed of the object and in which the surface of a running object is scanned by flying spots of light, the light reflected from the surface of the object is converted into an electrical signal by a light-receiving system, a defect, if any, on the surface of the object is detected in the form of a variation in the electrical signal, and the portion of the object is found where the detected defect is located among a plurality of portions into which the object is divided in the longitudinal direction.

DESCRIPTION OF THE PREFERRED EMBODIMENT

Figure 1:
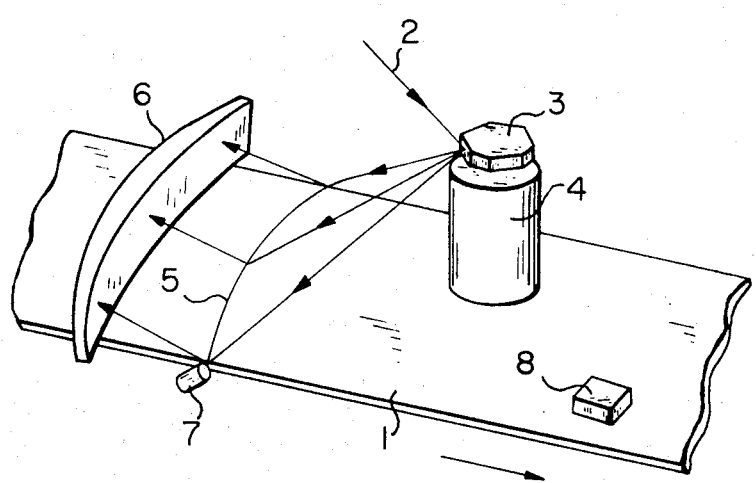
FIG. 1 is a schematic diagram showing a perspective view of the automatic defect inspector according to the present invention.

Referring to FIG. 1, the reference numeral 1 shows an object to be inspected which runs in the direction of the arrow, numeral 2 a beam of light generated from a light source including an incandescent lamp, mercury lamp or laser, and numeral 3 a rotary reflector consisting of a polygonal pole rotated by a driving means 4 and which reflects the light beam for continually scanning the surface of the object 1 in the transverse direction. Numeral 5 shows a locus of the scanning light beam. Numeral 6 shows a converter for converting the light beam 2 reflected from the surface of the object into an electrical pulse, and numeral 7 a second converter which directly receives the light beam 2, not after reflection on the surface of the onject, and which is placed at such a position where the light beam 2 is just to begin the scanning operation. Numeral 8 shows a device for detecting the speed of the running object 1. Where a defect, if any, detected by the converter 6 in the form of an electrical signal is located among the plurality of portions into which the object 1 was divided is known by a plurality of counter which are so arranged as to record electrical signals corresponding to the divided portions of the object 1.

Explanation will be made now of an embodiment in which the object 1 is divided into three portions in the longitudinal direction for the scanning purpose.

Figure 2:
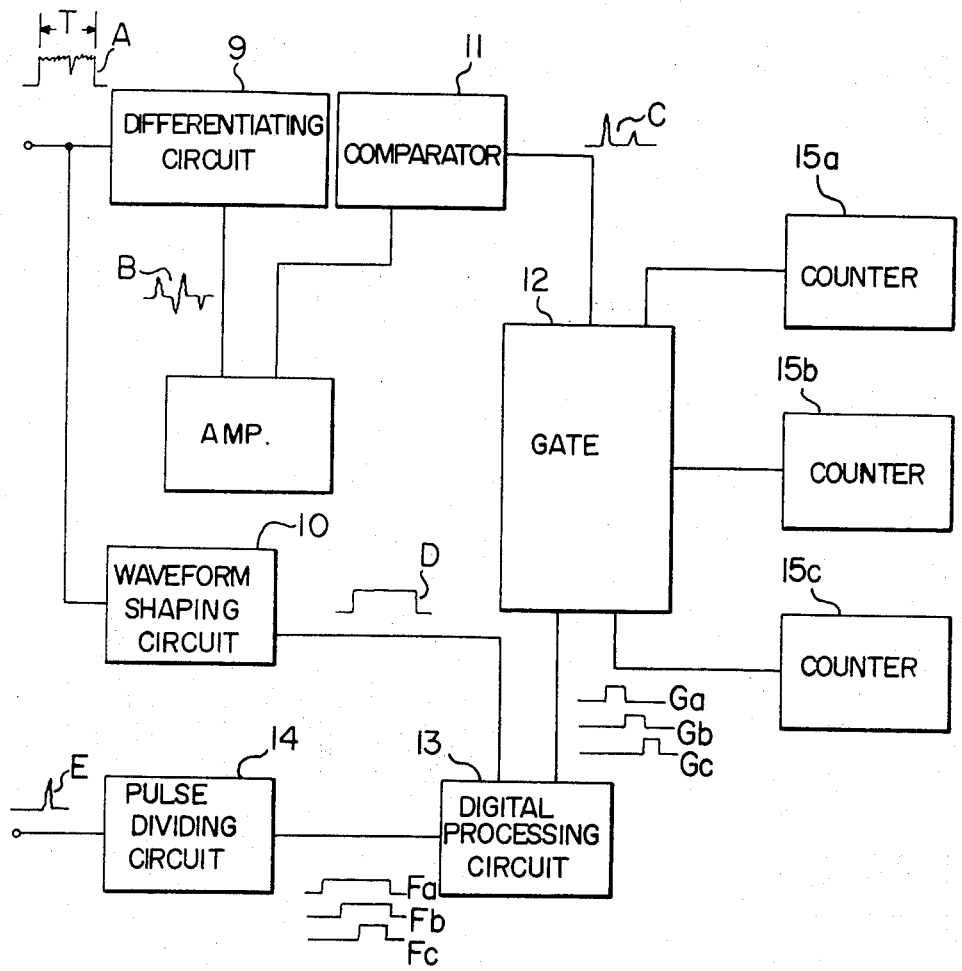
FIG. 2 is a block diagram showing a conventional defect inspector.

In FIG. 2, the electrical signal A with a pulse width equal to a transverse scanning time T is applied to the differentiating circuit 9 and wave-form shaping circuit 10. The differentiated signal B is changed by the comparator 11 into a defect signal C representing a defect, if any, with a magnitude not lower than a certain level, the signal C being applied to the gate 12. On the other hand, the electrical signal A applied to the wave-form shaping circuit 10 is transformed into a shaped pulse D with a pulse width equal to the duration of the scanning by the light beam 2 over the object 1. The shaped pulse D thus representing the width of the band-plate object is applied to the digital processing circuit 13. The electrical signal E from the converter 7 which directly receives the light beam 2 immediately before it begins to scan the object 1 is applied to a pulse dividing circuit 14 in the form of a trigger pulse. The pulse dividing circuit 14 produces three pulses Fa, Fb and Fc with different rise points, The pulses Fa, Fb and Fc being applied to the digital processing circuit 13. In the digital processing circuit 13, the shaped pulse D representing the width of the band-plate object and the three pulses Fa, Fb and Fc with different rise points combine to produce three pulses Ga, Gb and Gc representing the three divided portions of the object and having staggered rise and fall points, the rise point of one pulse occurring at the same time as the fall point of an adjacent pulse. The gate 12 to which the pulses Ga, Gb and Gc are applied in followed by the stage in which the counters 15a, 15b and 15c corresponding to the pulses Ga, Gb and Gc respectively record the defect signal C from the comparator 11 which represents a defect with a magnitude higher than a certain level. In this way, it is possible to find which portion of the object contains the defect by determining the pulses G a, Gb, and Gc so as to be indicative of the divided portions of the object, respectively. In this device, at the beginning and/or end of the scanning by the light beam 2 the edges of the object are possibly the false detected as defects thereby producing false signals. This may be prevented by providing a delay circuit for adjusting the pulse widths.

Hitherto, a delay circuit including three delay units has been employed for producing the divided pulses. In that case, however, the scanning speed of the light beam 2 is required to vary with the running speed of the object 1, resulting in the variation in the width of the shaped pulse D which is an output of the waveform shaping circuit 10 representing the width of the sheet object. This caused the width of the pulses Ga, Gb and Gc to change. Therefore, it is required to change the rising points of the three pulses Fa, Fb and Fc by changing the delay times of the delay units in order to provide the pulses Ga, Gb, and Gc with suitable widths. However, it is practically very difficult to satisfy such requirement.

Figure 3:
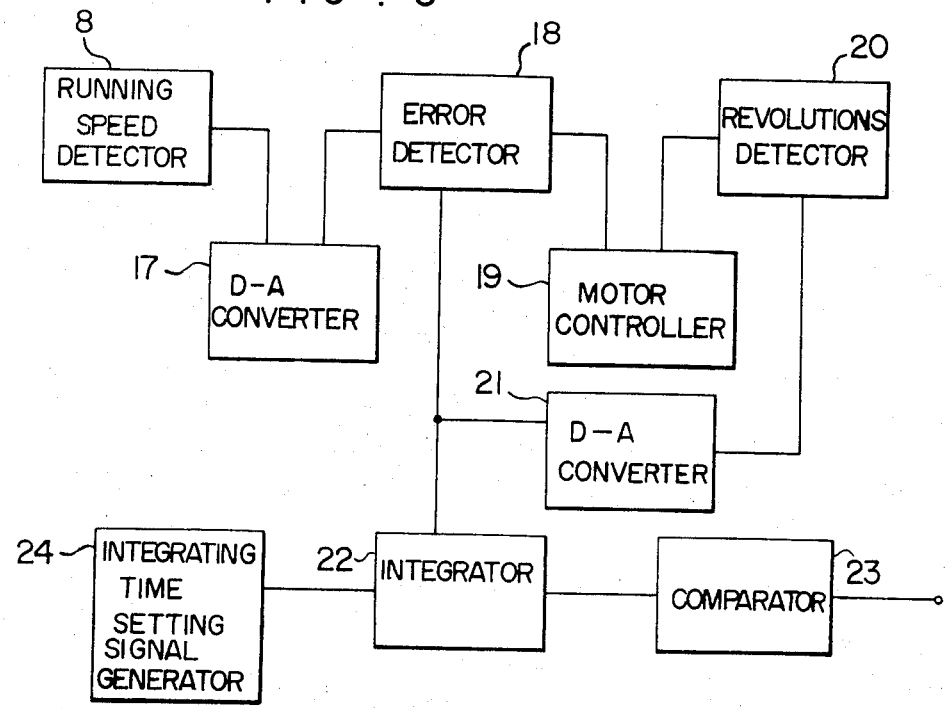
FIGS. 3 and 4 are block diagrams showing the apparatus according to the present invention.

This invention, which makes it easy to get the divided pulses in accordance with any change in the running speed of the object 1, will be explained in more detail with reference to the accompanying drawings. Referring to FIG. 3, the reference numeral 8 shows a device for detecting the running speed of the object 1, numeral 17 a D-A converter, numeral 18 an error detector circuit, numeral 19 a controller of the motor driving the rotary reflector 3, numeral 20 a revolutions-detecting section of the rotary reflector 3, numeral 21 a D-A converter, numeral 22 an integrator, numeral 23 a comparator circuit and numeral 24 a circuit for generating signals which determine the period of time over which the integrating operation is performed by the integrator 22. The running speed of the object 1 is detected by the running speed detector 2 in the form of a pulse signal of a frequency proportional thereto, which signal is converted into an analog value by the D-A converter 17. This signal representing the running speed of the object 1 controls the motor control section 19 through the error detector circuit 18 so that the revolutions of the rotary reflector 3 are changed in proportion to the running speed of the object 1. The revolutions of the rotary reflector 3 are detected by the revolutions detecting section 20 in the form of a digital value which is fed back to the error detector circuit 18 to regulate the revolutions. In this system of feedback control, the output of the D-A converter 21 which is proportional to the running speed of the object 1 is integrated by the integrator 22 to obtain the equation $$E_0 = -1/\tau \int_0^T v dt = -1/\tau \cdot vT$$

where $E_o$ is the output voltage of integrator 22, $\tau$ the time constant of the integrator 22, $r$ the output voltage of the D-A converter 21 which is proportional to the running speed of the object and T an integrating time which means a period of time over which the light beam 2 scans the surface of the object 1 once in the transverse direction. This time T is determined by the integrating time setting signal generator circuit 24 and is expressed as $T = l/V$, where $l$ is the width of the band-plate object and $V$ the scanning speed. Since the running speed of the object 1 is proportional to the scanning speed of the light beam 2, $E_o = -kl/\tau$ ($k$: a proportional constant), indicating that the output voltage of the integrator gradually increases from nil to $E_o$ after time T where it is proportional to the width of the band-plate object without regard to the running speed thereof. The output of the integrator 22 is applied to the comparator circuit 23 including a plurality of comparator units for producing pulses which respectively have rise points at different voltage levels. These pulses correspond to the output signal of the delay circuit of the conventional device, and therefore application of the output of the comparator circuit 23 to the digital processing unit permits production of pulses corresponding to the divided portions of the band-plate object 1 without being affected in any way by the running speed of the object 1. Although the above explanation of the invention involves the integration of an analog value proportional to the running speed of the object 1, the integration of a digital value may apply to the device of the invention with same degree of effect.

Figure 4:
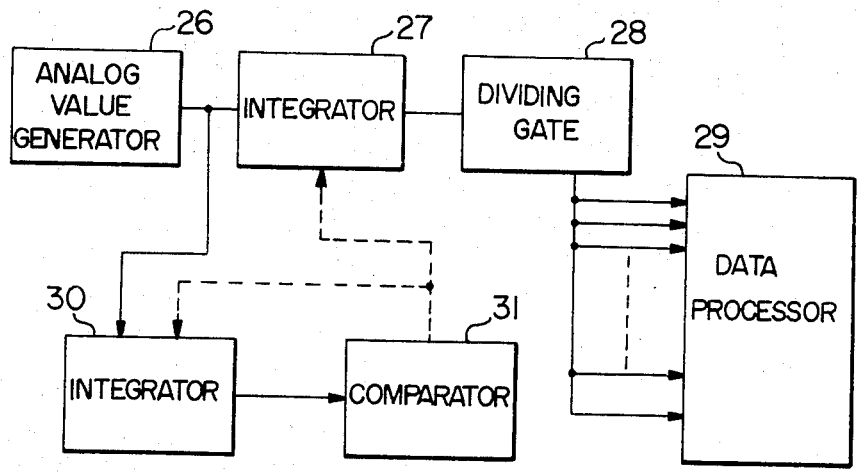

The integrating time T which is determined by the integrating time setting signal generator circuit 24 may be obtained either by erasing defect-carrying signals as a result of slicing an electrical signal from the converter 6 or by the output signals of such photoelectric elements as photo transistors disposed on both side edges of the object 1. In the former case, an error results when a defect on the surface of the object 1 is so large that the defect signal cannot be erased by the slicing of the output signal of the converter 6, while in the latter case a change in the width of the band-plate object 1 results in the inconvenience of the need for relocating the photoelectric elements although the magnitude of a defect does not affect the accuracy of detection. To overcome these difficulties, the embodiment of FIG. 4 is designed to locate a defect easily without regard to the magnitude thereof and a change in the width of the object 1.

The embodiment of the invention will be now explained with reference to FIG. 4. The reference numeral 26 shows an analog value-signal generator circuit, numeral 27 an integrator, numeral 28 a dividing gate circuit and numeral 29 a data processing unit which operates in the same way as the conventional device. Numeral 30 shows a second integrator, and numeral 31 a comparator with a reference voltage set therein which generates a reset signal when its input voltage reaches the level of the reference voltage. Also, the reference voltage is adapted to vary with the width of the band-plate object 1. As soon as an electrical signal is produced from the converter 6 after the scanning is started by the light beam 2, the integrators 27 and 30 start to integrate the analog value in proportion to the running speed of the object which is obtained from the analog signal generator circuit 26. Under this condition, there is a relation $$E_7 = -1/\tau_n \int_0^T v dt = -1/\tau_7 vT \qquad (1)$$

where $E_7$ is the output voltage of the integrator 27, $\tau_7$ the time constant thereof, T an integrating time, and $v$ an input voltage proportional to the running speed of the object 1. Also, $$E_{11} = -1/\tau_{11} \int_0^T v dt = -1/\tau_{11} vT$$

where $E_{11}$ is the output voltage of the integrator 30, $\tau_{11}$ the time constant thereof, T an integrating time, and $v$ an input voltage. The output of the integrator 30 is applied to the comparator 31 so that when the output of the integrator 30 reaches the level of the reference voltage of the comparator 31, the comparator 31 produces a reset signal for resetting the integrators 27 and 30. Therefore, the integrating time T continues from the instant when a signal due to the light beam 2 appears in the converter 6 to the time point when the output voltage of the integrator 30 reaches the level of the reference voltage of the comparator 31. The output of the integrator 27 is applied to the dividing gate circuit 28. In this case, it is desirable to maintain the output voltage constant for different integrating times, if a defect is to be easily located.

For this purpose, the time constant of the integrator 27 should be adapted to change in proportion to the reference voltage of the comparator 31. Since as will be understood from equation (1) the time constant and integrating time are proportional to each other, an increase in the reference voltage due to a greater width of the band-plate object results in a proportionately larger time constant of the integrator 27, thereby lengthening the period of time before the integrator 27 reaches a certain level of operation. A higher reference voltage lengthens the period of time before the output voltage of the integrator 30 reaches the reference voltage, thus lengthening the integrating time T, with the result that the output voltage of the integrator 27 is maintained constant without regard to the width of the sheet object.

As will be apparent from the above explaination, the accuracy of detection of the apparatus according to the present invention is affected by neither the running speed of the object to be inspected nor a large defect. Further, a defect, if any, can be easily located by changing the reference voltage even if the width of the sheet object changes.

We claim:

1. In an apparatus for detecting a defect on the surface of a running sheet object by applying a beam of light onto the surface of said object for the scanning thereof in the transverse direction, the improvement comprising means for detecting the running speed of said object, means for integrating the amount of electricity proportional to said running speed over a period of time needed for said beam of light to scan said surface of said object, a comparator including a plurality of comparator units for comparing the output of said integrating means with predetermined different reference levels and converting said output of said integrating means into a plurality of pulses with different rise points, digital processing means for converting said pulses and a signal obtained from the scanning of said surface of said object into a plurality of pulses having staggered rise and fall points, the rise point of one pulse occurring at the same time as the fall point of an object pulse and a plurality of recording means which are energized respectively in response to said converted pulses, said recording means recording in sequence defect-carrying signals obtained by the scanning.

2. In an apparatus for detecting a defect on the surface of a running sheet object by applying a beam of light onto the surface of said object for the scanning thereof, the improvement comprising means for detecting a voltage proportional to the running speed of said object, a couple of integrators which begins to integrate said voltage the instant that said beam of light begins to scan the surface of said object, a comparator which produces a reset signal when the output of one of said integrators reaches the level of the reference voltage of said comparator which is variable according to the width of said object, said integrator being reset by said reset signal, a gate circuit for producing a plurality of divided pulses in response to the output of the other of said integrators which has a time constant variable with said reference voltage, each of said divided pulses having a rise point occurring at the same time as the fall point of an adjacent divided pulse, a plurality of recording means corresponding to and energized respectively by said divided pulses, said recording means recording in sequence defect-carrying signals obtained by the scanning of said surface of said object.

* * * * *